UNITED STATES PATENT OFFICE.

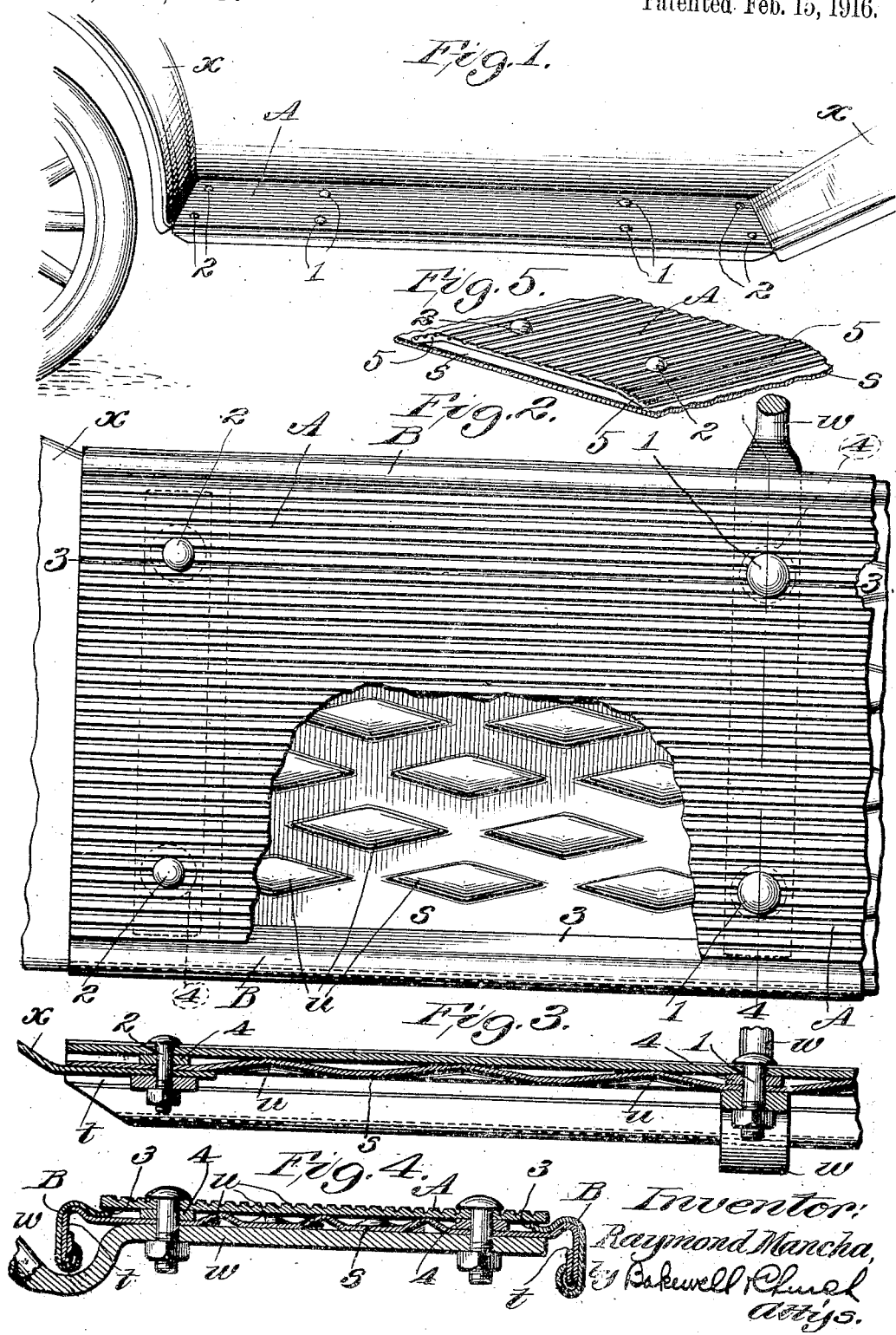

RAYMOND MANCHA, OF ST. LOUIS, MISSOURI.

COVER FOR AUTOMOBILE RUNNING-BOARDS.

1,171,863.

Specification of Letters Patent.

Patented Feb. 15, 1916.

Application filed May 17, 1915. Serial No. 28,644.

*To all whom it may concern:*

Be it known that I, RAYMOND MANCHA, a citizen of the United States, residing at St. Louis, Missouri, have invented a certain new and useful Improvement in Covers for Automobile Running-Boards, of which the following is a full, clear, and exact description, such as will enable others skilled in the art to which it appertains to make and use the same.

This invention relates to automobile running boards, and has for its main object to provide a strong and serviceable, rust-proof metal cover for automobile running boards that greatly improves the appearance of the automobile and which can be applied easily.

Another object is to provide a rust and wear proof metal cover for automobile running boards which is so constructed that the only fastening devices required to hold it in operative position are the same fastening devices that are employed for securing the running board to the parts of the machine that carry same. And still another object is to provide an inexpensive running board cover for Ford automobiles that can be applied by a person unskilled in mechanics and which converts the running board of such an automobile into an ornamental structure that will not rust and which will successfully withstand hard wear and rough usage.

Other objects and desirable features of my invention will be hereinafter pointed out.

Figure 1 is a perspective view, showing my improved cover applied to the running board of a Ford automobile. Fig. 2 is an enlarged top plan view, partly broken away, of a portion of my improved cover. Fig. 3 is a vertical, longitudinal-sectional view taken on the line 3—3 of Fig. 2. Fig. 4 is a vertical, transverse-sectional view taken on the line 4—4 of Fig. 2; and Fig. 5 is a perspective view, illustrating a slight modification of my invention.

I have herein illustrated my invention embodied in a running board cover that is designed for use on the running board $s$ of a Ford automobile, which, as is generally known, is formed from a sheet of steel whose longitudinal edge portions are bent downwardly and doubled over to form depending flanges $t$, said sheet having diamond-shaped protuberances or raised portions $u$ formed in same, as shown in Figs. 2, 3 and 4, so as to stiffen the sheet and form a roughened surface on the top face of the running board. The running board $s$ is mounted on brackets or hangers $w$ on the frame of the machine to which the running board is connected by means of bolts 1 and the end portions of the running board are secured to the front and rear fenders $x$ by means of bolts 2. The running board $s$ is merely coated with paint or enamel, which soon wears off, and unless the running board is painted or enameled frequently, it will soon rust out. The result is that the running boards of Ford automobiles and other automobiles provided with sheet metal running boards look worn and marred shortly after the machine has been put in use, and constant care on the part of the owner is required to prevent the running board from being eaten away by rust.

My complete running board cover preferably consists of a center portion that protects the top surface of the running board and two side portions that protect the edge portions of the running board, said cover being formed from rust-proof metal, preferably aluminum, and constructed in such a manner that it can be applied easily by a person unskilled in mechanics.

In the preferred form of my invention, as herein shown, said cover consists of a member A that extends over and protects the top surface of the running board $s$ and two side members B that incase the edge portions of the running board $s$ and the depending flanges $t$ thereon. The member A is formed from a flat sheet of aluminum, or other suitable rust-proof metal that has sufficient strength or stiffness to prevent it from bending or becoming indented when it is subjected to a heavy load or sharp blow and the members B are formed from thinner sheet aluminum or other suitable rust-proof material that can be bent or flanged without liability of breaking. The member A is retained in operative position by the bolts 1 and 2 that secure the running board $s$ to the brackets $w$ and to the fenders of the automobile, and the underside of said member A is preferably made flat so that it will bear squarely or evenly upon the protuberances or raised portions $u$ on the running board, thereby causing the member A to be firmly supported throughout its entire length and width. The side members B are of such cross-sectional shape that when they are slipped longitudinally over the edge portions and the depending flanges $t$ on the running board the edges of same will press tightly against said flanges.

As shown in Fig. 4, the lower portion of each of the members B is large enough so that it will accommodate flanges $t$ of various depths, and it is so formed that the part of same which bears against the inner side of the flange $t$ with which it coöperates will bite into said flange, or, in other words, have sufficient resiliency to hold its edge pressed tightly against said flange. By forming the side members B in this manner I insure said members being held securely in position without the aid of fastening devices. The members B have portions 3 that project laterally underneath the longitudinal edge portions of the member A, and if desired, the laterally-projecting portions 3 on the members B can be bent upwardly slightly, as shown in Fig. 4, so as to form supporting devices for the side edge portions of the member A that lie in the same horizontal plane as the tops of the protuberances $u$ on the running board $s$. Washers 4 are preferably arranged on the bolts 1 and 2 between the running board $s$ and the underside of the member A, so as to firmly support said member at the points where the bolts pass through same, and thus eliminate the possibility of the member A being bent by drawing the bolts too tight during the operation of applying the member A to the running board.

As shown in Fig. 4, the center member A laps over the inwardly-projecting portion 3 on the side members B in such a way that it securely clamps the members B in position and prevents them from being stripped or pulled laterally off the edge portions of the running board, as might occur if the members B were provided with exposed edges. The top surface of the member A is preferably fluted so as to impart a neat and ornamental appearance to same and also form a relatively rough surface on that portion of my improved cover which a person's foot rests on upon entering or leaving the automobile.

Instead of making the member A perfectly flat throughout its entire width, as shown in Fig. 4, the longitudinal edge portions of said member can be bent downwardly slightly at 5, as shown in Fig. 5, so as to cause the side edges of the member A to bear tightly against the members B or against the running board $s$ when the side members B are not employed. A member A of the cross-sectional shape shown in Fig. 5 is exceptionally strong and rigid, thus enabling it to be formed from comparatively light-weight sheet metal and the flanged portions 5 at the sides of same are pressed so tightly against the members B or against the running board after the bolts 1 and 2 have been tightened, that it is impossible for the member A to rattle.

While my complete running board cover preferably consists of three separate members, it will, of course, be obvious that one or both of the members B could be omitted without departing from the spirit of my invention, as the portion of the running board that is subjected to the greatest wear is that portion of the running board which is covered by the member A of the cover.

A running board cover of the construction above described can be manufactured cheaply; it can be applied easily by an unskilled person by simply removing the running board $s$, slipping the members B longitudinally over the side edge portions and flanges $t$ of same and then placing the member A over the running board and securing both of said elements to the running board hangers $w$ and to the fenders $x$ by inserting the bolts 1 and 2. Such a device adds greatly to the appearance of any automobile provided with a sheet steel running board, and as it is formed from rust-proof metal that is strong and rigid enough to successfully withstand hard wear and usage, it does not become unsightly after it has been in use for a short period. In addition to improving the appearance of the automobile, a running board cover of the construction above described reinforces and strengthens the running board on which it is applied, as the member A of the cover consists of a stiff or rigid sheet of metal that extends throughout the entire length and width of the running board and which is bound to same securely by the bolts 1. Consequently, the cover can be used advantageously for repairing a broken or defective sheet metal running board. The bolts 1 and 2 that retain the member A in position are preferably galvanized or formed from rust-proof metal, said bolts forming part of the complete cover so that they can be substituted for the usual iron bolts employed in Ford automobiles for securing the running board in position.

While I have described my invention as consisting of a running board cover designed for use on a Ford automobile, I wish it to be understood that my broad idea is not limited to a running board cover of the particular design herein shown, as my broad idea consists in a detachable, rust-proof cover formed of metal that has great wear-resisting properties which is adapted to be applied to an automobile running board so as to protect and improve the appearance of same.

Having thus described my invention, what I claim, and desire to secure by Letters Patent, is:

In an automobile, the combination of a sheet metal running board provided on its longitudinal edges with depending flanges and having projections on its top surface, a rust-proof metal protecting member covering the top surface of said board and resting on the projections thereon, and rust-proof metal side members arranged in telescopic engagement with the depending flanges on said running board and provided with portions that project laterally under said protecting member so as to form supporting devices for the side edge portions of same.

In testimony whereof I hereunto affix my signature in the presence of two witnesses, this fourteenth day of May, 1915.

RAYMOND MANCHA.

Witnesses:
  WELLS L. CHURCH,
  GEORGE BAKEWELL.